United States Patent [19]
Mineo

[11] Patent Number: 6,113,446
[45] Date of Patent: *Sep. 5, 2000

[54] EXHAUST ARRANGEMENT FOR SMALL WATERCRAFT

[75] Inventor: Shigeharu Mineo, Iwata, Japan

[73] Assignee: Yamaha Hatsudoki Kabushiki Kaisha, Shizuoka-ken, Japan

[*] Notice: This patent is subject to a terminal disclaimer.

[21] Appl. No.: 09/028,445

[22] Filed: Feb. 24, 1998

[30] Foreign Application Priority Data

Feb. 24, 1997 [JP] Japan ................................. 9-038846

[51] Int. Cl.⁷ .................................................. B63H 21/32
[52] U.S. Cl. .............................................................. 440/89
[58] Field of Search ..................... 440/88, 89; 114/55.5; 60/310; 181/235, 212, 227, 228

[56] References Cited

U.S. PATENT DOCUMENTS

| | | |
|---|---|---|
| 4,202,297 | 5/1980 | Oku et al. . |
| 4,285,311 | 8/1981 | Iio . |
| 4,321,893 | 3/1982 | Yamamoto . |
| 4,364,346 | 12/1982 | Shiohara . |
| 4,714,061 | 12/1987 | Nakayama et al. . |
| 4,915,070 | 4/1990 | Okui . |
| 4,998,512 | 3/1991 | Masuda et al. . |
| 5,000,131 | 3/1991 | Masuda et al. . |
| 5,007,386 | 4/1991 | Washizu et al. . |
| 5,018,485 | 5/1991 | Washizu et al. . |
| 5,063,887 | 11/1991 | Ozawa et al. . |
| 5,063,888 | 11/1991 | Ozawa et al. . |
| 5,099,945 | 3/1992 | Okui et al. . |
| 5,220,890 | 6/1993 | Koriyama . |
| 5,511,505 | 4/1996 | Kobayashi et al. . |
| 5,558,549 | 9/1996 | Nakase et al. . |
| 5,572,943 | 11/1996 | Kobayashi et al. . |
| 5,660,152 | 8/1997 | Masuda . |
| 5,827,096 | 10/1998 | Mineo ...................................... 440/89 |

*Primary Examiner*—Ed Swinehart
*Attorney, Agent, or Firm*—Knobbe, Martens, Olson & Bear LLP

[57] ABSTRACT

An engine for a watercraft has an exhaust system having an exhaust pipe and an expansion chamber. The exhaust pipe has a plurality of runners corresponding to the number of cylinders in the engine. The runners extend upward to a merge point and then longitudinally in a generally forward direction. The exhaust pipe wraps around a front surface of the cylinder block and connects to an exhaust chamber. The exhaust pipe and exhaust chamber protect sensitive engine components, such as spark plugs and an exhaust control valve and actuating system from sloshing water. In addition, the exhaust system extends the length of the runners and enhances side-to-side balancing of the engine.

34 Claims, 8 Drawing Sheets

EXHAUST ARRANGEMENT FOR SMALL WATERCRAFT

FIELD OF THE INVENTION

The present invention relates to an exhaust system. More particularly, the invention relates to an exhaust system for an engine of the type powering a personal watercraft.

BACKGROUND OF THE INVENTION

Personal watercraft have become very popular in recent years. This type of watercraft is quite sporting in nature and carries a rider and possibly one or two passengers. A relatively small hull of the personal watercraft commonly defines a riders' area above an engine compartment. A two-cycle internal combustion engine frequently powers a jet propulsion unit which propels the watercraft. The engine lies within the engine compartment in front of a tunnel formed on the underside of the watercraft hull. The jet propulsion unit is located within the tunnel and is driven by a drive shaft. The drive shaft usually extends between the engine and the jet propulsion device, through a wall of the hull that forms the front gullet portion of the tunnel.

Personal watercrafts often employ an in-line, multi-cylinder, crankcase compression, two-cycle engine. The engine conventionally lies within the engine compartment with the in-line cylinders aligned along the a longitudinal axis of the watercraft hull. An exhaust system communicates with the cylinders of the engine and extends to a discharge located near the stern of the watercraft. In this manner, exhaust gases are expelled from the watercraft hull and engine compartment.

Exhaust systems within personal watercraft typically employ some form of manifold exhaust system to account for weight and cost concerns. Prior exhaust manifold systems use one runner for each cylinder which communicates with the exhaust port of the respective cylinder. At a point downstream of the ports, the runners merge together. Because each cylinder discharging exhaust into the exhaust manifold does so at different times, it is important to be able to control the respective pressure pulses associated with the discharges by tuning the length of the exhaust runners. The desired tuning is difficult to achieve, however, due to the cramped space provided within the engine compartment of a personal watercraft.

Additionally, due to the cramped space available within the personal watercraft engine hull, manufacturers have begun to utilize an inclined cylinder engine arrangement. The weight of the exhaust system and the corresponding cylinders, which are then placed off-center, can create balancing problems. In the past, the engine weight distribution was sought to be centered through a centrally located engine. The inclined cylinders, however, do not readily allow a personal watercraft employing an inclined engine to be balanced side-to-side.

Further, water constantly enters the engine compartment of a small watercraft through the air vents due to the sporting nature of the watercraft. Although bilge pumps operate to evacuate any water that accumulates within the compartment, such water may tend to splash from side to side before evacuated when the personal watercraft is being maneuvered. The splashing water can compromise engine performance when sensitive engine components become wet. For instance, exhaust control valves and ignition systems performance typically are hindered when operating in a wet environment.

SUMMARY OF THE INVENTION

Accordingly, a need exists for an exhaust system configured to lengthen the exhaust pipes while remaining within the confine of the personal watercraft hull. Additionally, a need exists for a personal watercraft having a centrally located inclined engine configured for ease in side-to-side balancing of the watercraft during use. Further, a need exists for an engine configured to protect sensitive components from inadvertent splashing while the personal watercraft is in use.

An aspect of the present invention involves an engine for a watercraft. The engine includes an output shaft that is journaled to rotate about a rotational axis. The engine also includes at least one inclined cylinder that has an axis which is skewed relative to a longitudinally-extending, vertical plane that contains the axis about which the output shaft rotates. An exhaust system is provided for discharging exhaust gases from the engine. The exhaust system includes an exhaust pipe and an exhaust chamber. The exhaust pipe is coupled to the cylinder on a side of the vertical plane and is coupled to the exhaust chamber on an opposite second side of the vertical plane. In a preferred embodiment, the exhaust chamber is arranged so as to lie entirely on the second side of the vertical plane.

An additional aspect of the present invention involves an engine for a watercraft that comprises an output shaft. The output shaft rotates about a rotational axis which is defined within a longitudinal vertical plane. An exhaust system of the engine includes an exhaust pipe and an exhaust chamber with the exhaust pipe extending at least partially between the exhaust chamber and a cylinder. The exhaust pipe and the exhaust chamber each include a longitudinal section that extends generally parallel to the longitudinal vertical plane. The exhaust pipe and the exhaust chamber also are arranged with at least portions of the longitudinal sections lying above a horizontal plane that is generally normal to the longitudinal vertical plane as defined at an uppermost portion of the cylinder.

In accordance with an additional aspect of the present invention, an engine for a small watercraft is provided. The engine comprises an output shaft that rotates about an axis and a plurality of cylinders that are located substantially to one side of the vertical longitudinally-extending plane that contains the axis. An exhaust pipe extends from each cylinder. At least two of the exhaust pipes merge together at a merge portion of the exhaust pipe. The merge portion is arranged substantially on a side of the longitudinal vertical plane opposite the side on which the at least two exhaust pipes communicate with the respective cylinders.

Another aspect of the present invention involves an engine for a watercraft. The engine includes a cylinder having an exhaust port. An exhaust branch pipe communicates with the cylinder and has a first portion and a second portion. The first portion of the exhaust pipe is coupled to the cylinder and the second portion of the exhaust branch pipe extends in a generally upward direction. An exhaust control valve operates between the cylinder and the first portion of the exhaust branch pipe. A valve actuator transmission is coupled to the exhaust control valve and is located in an area that is defined between the cylinder, the first portion of the exhaust branch pipe, and a second portion of an exhaust branch pipe. In this position, the valve actuator transmission is generally shielded from any water which may slosh around within the hull of the watercraft as the watercraft leans from side to side when turning.

Further aspects, features and advantages of the present invention will now become apparent from the detailed description of the preferred embodiments which follow.

BRIEF DESCRIPTION OF THE DRAWINGS

These and other features of the invention will now be described with reference to the drawings of preferred embodiments of the exhaust system. The different embodiments of the invention are intended to illustrate and not to limit the invention. To assist the reader's understanding of the description of the embodiments which follow, the following provides a brief description of the referenced drawing.

DETAILED DESCRIPTION OF THE PREFERRED EMBODIMENT

Figure 1:
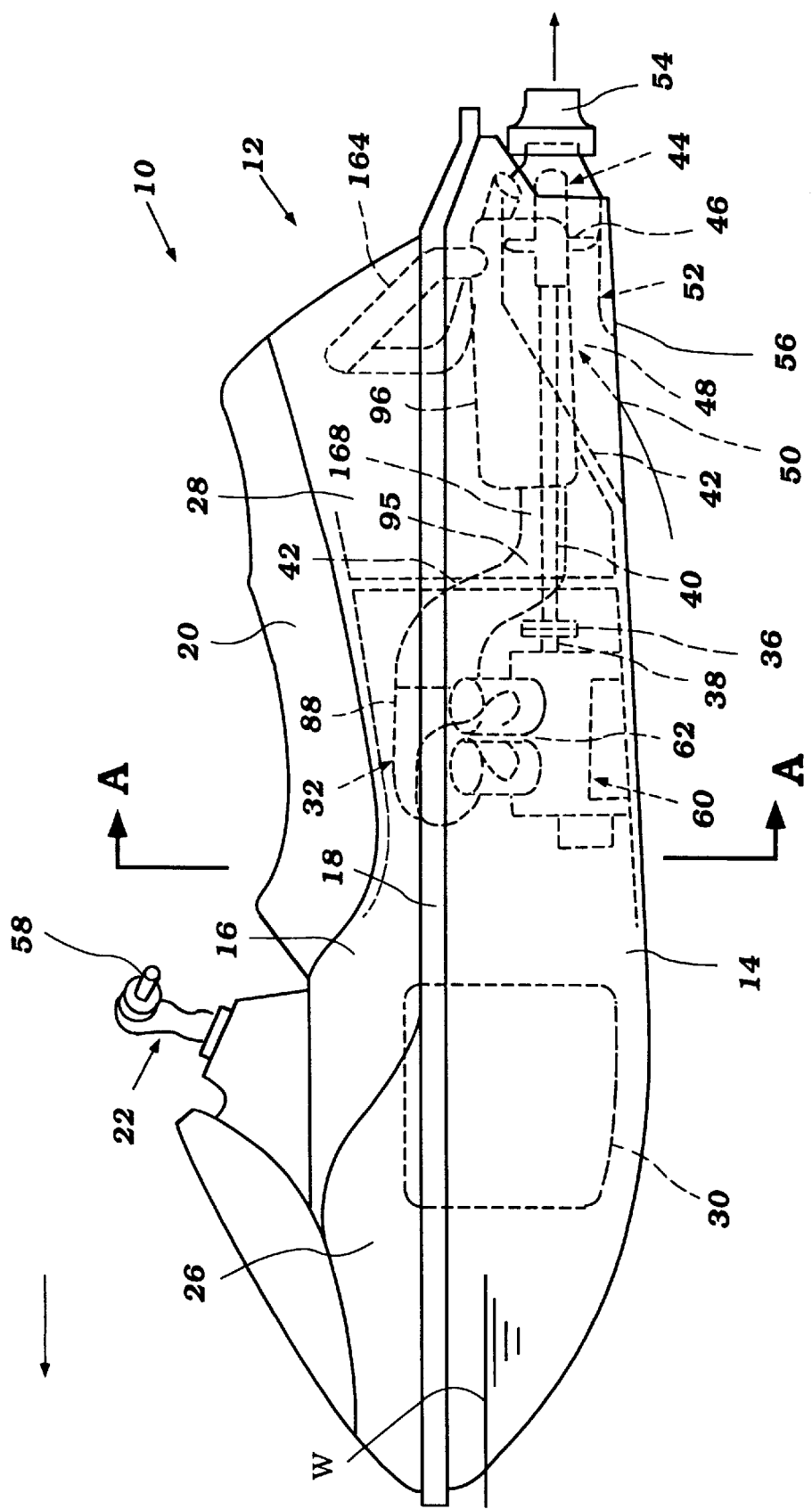
FIG. 1 is a side elevational view of a personal watercraft including an engine and exhaust system configured in accordance with a preferred embodiment of the present invention and illustrates several internal components in phantom.
Figure 2:
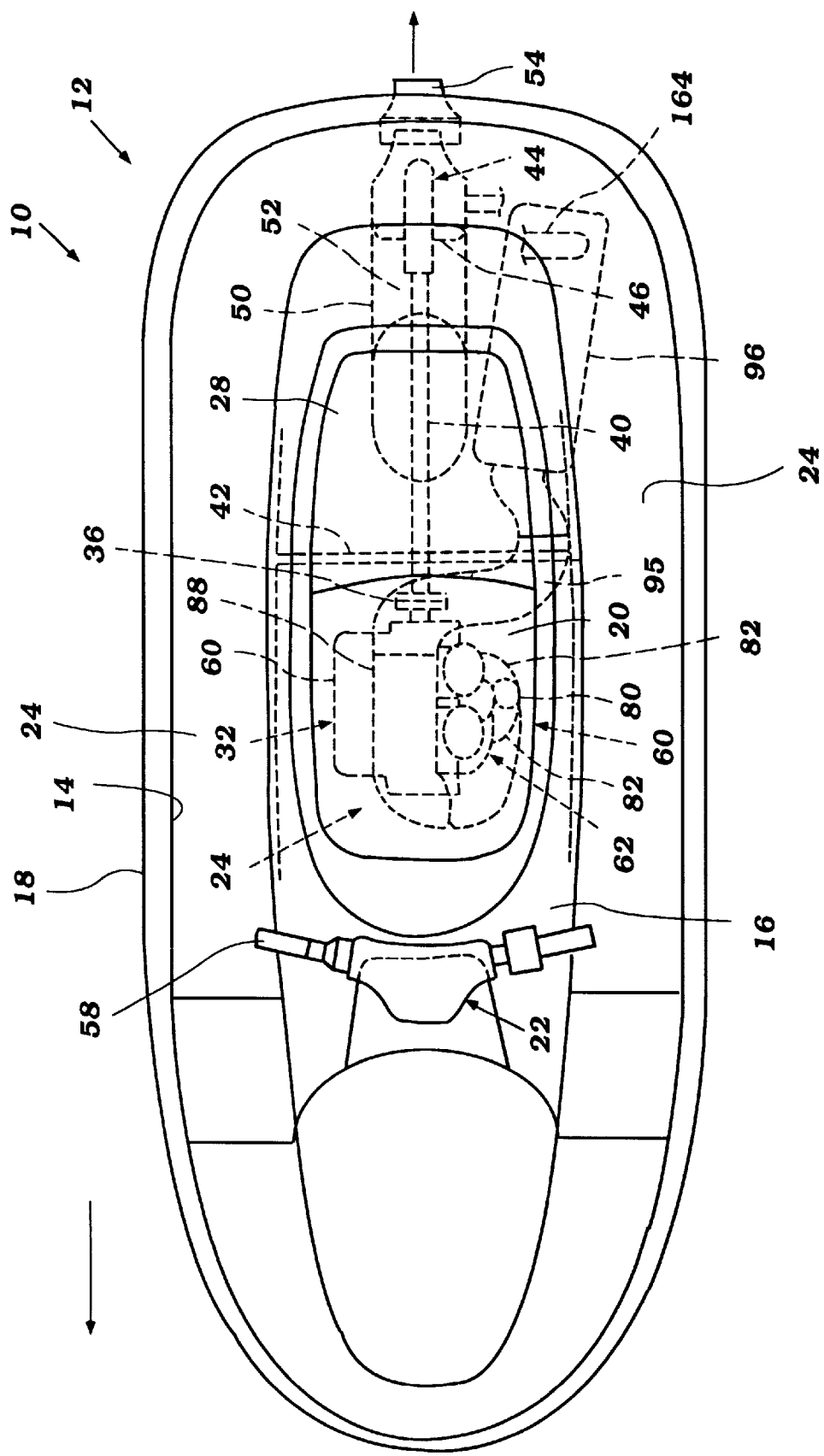
FIG. 2 is a top plan view of the watercraft of FIG. 1 and illustrates several internal components in phantom.
Figure 3:
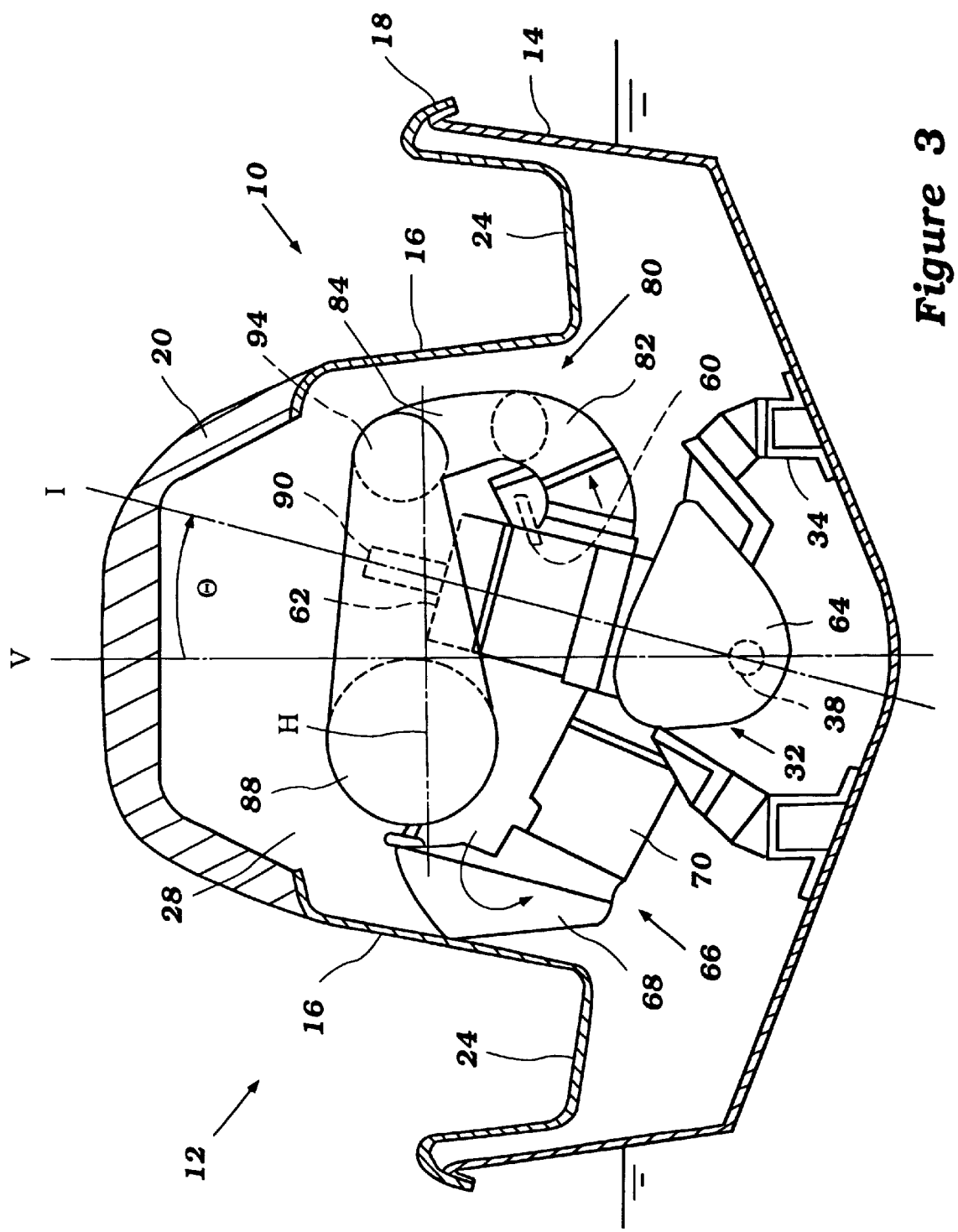
FIG. 3 is a partial sectional view of the watercraft of FIG. 1 taken along line A—A.

FIGS. 1 through 3 illustrate a personal watercraft 10 which includes an engine exhaust system configured and arranged in accordance with a preferred embodiment of the present invention. Although the present exhaust system is illustrated in connection with a personal watercraft, the exhaust system can be used with engines for other types of watercraft and vehicles as well, such as, for example, but without limitation, small jet boats, and the like.

Before describing the present exhaust system, an exemplary personal watercraft 10 will first be described in general details to assist the reader's understanding of the environment of use and the operation of the exhaust system. In addition, in order to assist the reader's understanding of the following description, an orthogonal coordinates system has been provided. A "lateral" axis generally extends side to side; a "longitudinal" axis generally extends between the bow and stern and lies perpendicular to the lateral axis; and a vertical axis lies perpendicular to both the longitudinal and lateral axis.

As illustrated in FIGS. 1 and 2, the watercraft 10 includes a hull 12 formed by a lower hull section 14 and an upper deck section 16. The hull sections 14, 16 are formed from a suitable material such as, for example, a molded fiberglass reinforced resin. The lower hull section 14 and the upper deck section 16 are fixed to each other around the peripheral edges 18 in any suitable manner.

A passenger seat 20 is provided proximate to the stern of the hull 12 as shown in FIGS. 1 and 2. The passenger seat 20 is mounted longitudinally along the center of the watercraft 10. In the illustrated embodiment, the seat 20 has a longitudinally extended straddle-type shape which may be straddled by an operator and by at least one or two passengers. A forward end of the seat 20 lies proximate to the controls 22 of the watercraft 10 which generally lie at about the longitudinal center of the watercraft 10. This position of the operator on the watercraft 10 gives the watercraft 10 fore and aft balance when the operator rides alone. A rear portion of the seat 20 is configured to allow one or two passengers to be comfortably seated behind the operator of the watercraft 10. The seat 20 desirably includes a removable seat cushion to increase the comfort of the operator and the passengers.

As seen in FIG. 3, the upper deck section 16 of the hull 12 advantageously includes at least a pair of foot areas 24. The foot areas 24 extend generally longitudinally and parallel to the sides of the elongated seat 20 so that the operator and any passengers sitting on the seat 20 can place their feet in the foot areas 24. A non-slip surface (not shown) is located in the foot areas 24 to provide increased grip and traction for the operator and the passengers.

The lower hull section 14 of the personal watercraft 10 includes a forward compartment 26 and a rear compartment 28 as shown in FIGS. 1 and 2. In the exemplary watercraft depicted in FIG. 1, a fuel tank 30 and a buoyant block (not illustrated) are located in the forward compartment 26. The buoyant block affords additional buoyancy to the watercraft 10.

An internal combustion engine 32 powers the watercraft 10. As depicted in FIGS. 1 and 2, the engine 32 is contained within a front or engine compartment 29 and is mounted primarily beneath the forward portion of the seat 20. Engine mounts 34 secure the engine 32 to the hull lower portion 14 in a known manner. The engine 32 is desirably mounted in approximately a central position in the watercraft 10.

As seen in FIG. 1, a coupling 36 interconnects an engine output shaft 38 to an impeller shaft 40.

The impeller shaft 40 extends rearward through a bulkhead 42, and a protective sleeve (not shown), to a jet propulsion unit 44 and drives an impeller 46 of the unit. A bearing assembly (not shown), which is secured to the bulkhead 42, supports the impeller shaft 40 behind the shaft coupling 36.

The jet propulsion unit 44 is positioned in a tunnel 48 in the rear center of the lower hull section 14 located behind the bulkhead 42. The propulsion unit 44 includes a gullet 50 having an inlet opening formed on the bottom side of the lower hull section 14. The gullet 50 extends from the inlet opening to a pressurization chamber 52. The pressurization chamber 52 in turn communicates with a nozzle 54 section of the propulsion unit 44. A ride plate 56 covers a portion of the tunnel 48 behind the gullet 50 inlet to enclose the propulsion unit 44 and the nozzle 54 within the tunnel 48. In this manner, the lower opening of the tunnel 48 is closed by the front edge of the gullet 50 and the ride plate 56.

The jet propulsion unit has a rotating impeller 46, which the impeller shaft 40 drives. The impeller 46 pressurizes the water within the pressurization chamber 52 and forces the pressurized water through the nozzle 54 section of the jet propulsion unit. A steering nozzle 54 directs the exit direction of the water stream exiting the jet propulsion unit 44. The steering nozzle 54 is pivotally supported at the rear of the jet propulsion unit 44 to change the thrust angle on the watercraft 10 for steering purposes as is known in the art.

The steering nozzle 54 is connected to a steering handle 58. The steering handle 58 forms part of the operator controls 22 which are mounted in front of the operator seat 20 as noted above. The steering handle 58 also can include a throttle control for controlling the speed of the engine.

The impeller 46 is located toward the front end of the pressurization chamber 52. A central support (not shown) supports the rear end of the impeller shaft 40 behind the impeller 46 and generally at the center of the pressurization chamber 52. A bearing assembly (not shown) journals the rear end of the impeller shaft 40 within the support.

In the illustrated embodiment, the engine 32 includes two in-line cylinders and operates on a two-stroke compression principle. This engine type, however, is merely exemplary. Those skilled in the art will readily appreciate that the illustrated exhaust system can be used with any of a variety of engine types having other number of cylinders, having other cylinder arrangements and operating on other combustion principles (e.g., four-stroke principle). As shown in FIG. 3, the illustrated engine 32 is positioned such that the row of cylinders lies inclined to a longitudinal vertical plane, V, of the watercraft 10. The illustrated engine 32 is desirably inclined such that a center axis of the cylinders is skewed to the longitudinal vertical plane, V. In particular, the center axis is inclined along line I in the illustrated embodiment. The illustrated engine 32 also extends substantially longitudinally; notably, the engine 34 can also be arranged with the output shaft oriented in a generally lateral direction.

As best shown in FIG. 3, a cylinder block 60 and a cylinder head assembly 62 desirably form the cylinders of the engine 32. In particular, the engine 32 desirably includes a cylinder block 60 assembly that defines a pair of parallel cylinder bores formed by cylinder liners (not shown). Each cylinder liner is cast or pressed in place in a cylinder block 60.

Pistons (not shown) reciprocate within the cylinders of the engine 32 and are pivotally connected to the small ends of connecting rods (not shown) by means of piston pins (not shown). The big ends of the connecting rods in turn are connected to throws of a crankshaft 38. Thus, the pistons drive the crankshaft 38, which in the illustrated embodiment also functions as the output shaft, through the connecting rods. The crankshaft 38 desirably is journaled to rotate about a rotational axis within a crankcase 64, which in the illustrated embodiment is located beneath the cylinder block 60.

A conventional induction system 66 supplies a fuel/air charge to a plurality of crankcase chambers formed within the crankcase 64. In the illustrated embodiment, the induction system 66 of the engine 32 includes at least one charge former that receives fuel from the fuel tank 30. Air is received by the induction system 66 through an air intake silencer 68. The air and fuel are mixed within a charge former. As will be recognized by those skilled in the art, the charge former may include either a carburetor or a set of fuel injectors. The illustrated engine 32 desirably utilizes a carburetor 70; however, the engine 32 can also include direct fuel injection as well.

In the illustrated embodiments, the crankcase chambers of the engine 32 are sealed from one another with each crankcase chamber communicating with a dedicated combustion chamber via one or more scavenge passages. The combustion chamber is defined by the corresponding cylinder bore, piston and cylinder head. Because the internal details of the engine desirably are conventional, a further description of the engine construction is not believed necessary to understand and practice the invention.

The personal watercraft so far described is conventional and represents only an exemplary watercraft on which the present exhaust system can be employed. A further description of the personal watercraft therefore is not believed necessary for an understanding and an appreciation of the illustrated exhaust system. The exhaust system and exhaust cooling systems, which are desirably used with the engine, will now be described in detail.

Exhaust gas generated by the engine 32 is routed from the engine 32 to a point external to the watercraft 10 by an exhaust system 72 which includes an exhaust passage 74 leading from each combustion chamber. Each exhaust passage 74 extends from an exhaust port 76 formed in the side of the cylinder wall to an exhaust discharge port 78 located on the side of the cylinder block 60. The side of the cylinder block has a boss 115 located on each cylinder. An exhaust control valve, which will be discussed in detail below, is desirably provided within the boss in the illustrated embodiment. In addition, in the illustrated embodiment an actuator transmission is located in a region above the bosses 115.

An exhaust manifold or pipe 80 is connected to a side of the engine 32. The exhaust pipe 80 has a pair of exhaust branch pipes or runners 82 with passages leading therethrough aligned with the passages 74 leading through the cylinder head 62. The branches 82 of the exhaust pipe 80 merge at a merge pipe portion 84 of the exhaust pipe 80. The merge pipe 84 portion has a passage through which the exhaust is routed. The exhaust pipe 80, in the illustrated embodiment of FIGS. 1 through 4B, desirably curls about the front of the cylinder block 60 as it extends from the merge pipe portion 84 of the exhaust system 72.

A spark plug 90 is located atop each cylinder in the illustrated embodiment. The spark plug ignites the fuel-air charge held within the combustion chamber in a known manner. The spark plug is, thus, contained within the curl of the exhaust pipe 80 as described directly above and illustrated in FIGS. 1–4B.

Figure 4A:
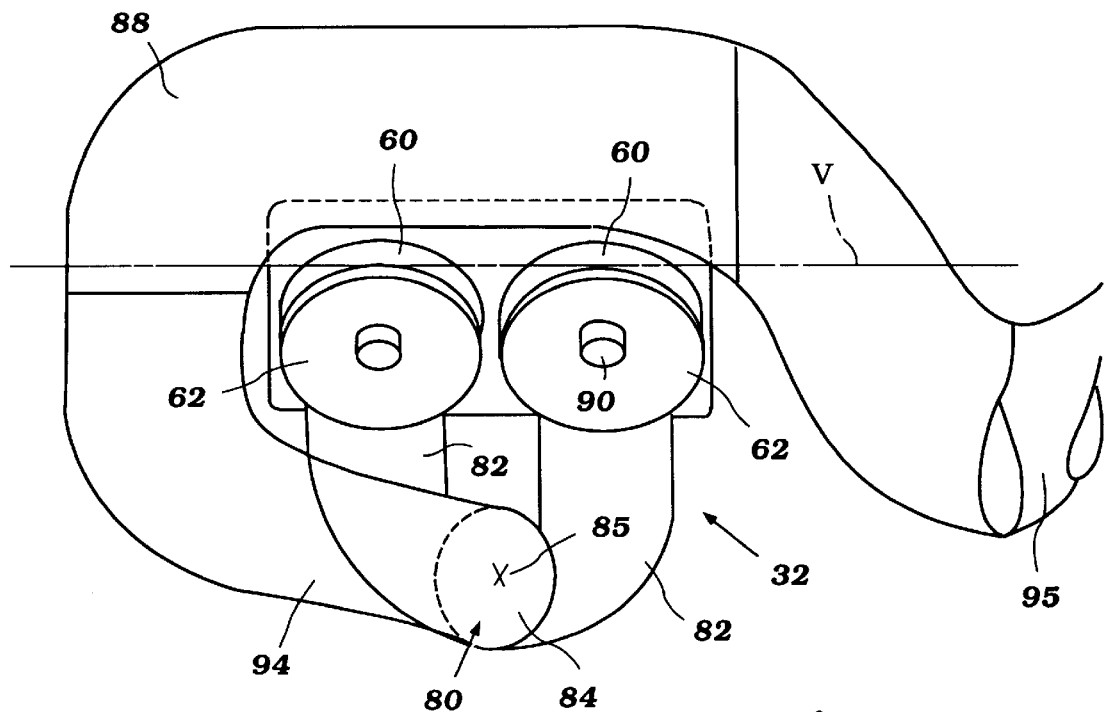
FIG. 4A is a top plan view of the engine and exhaust system of FIG. 1.
Figure 4B:
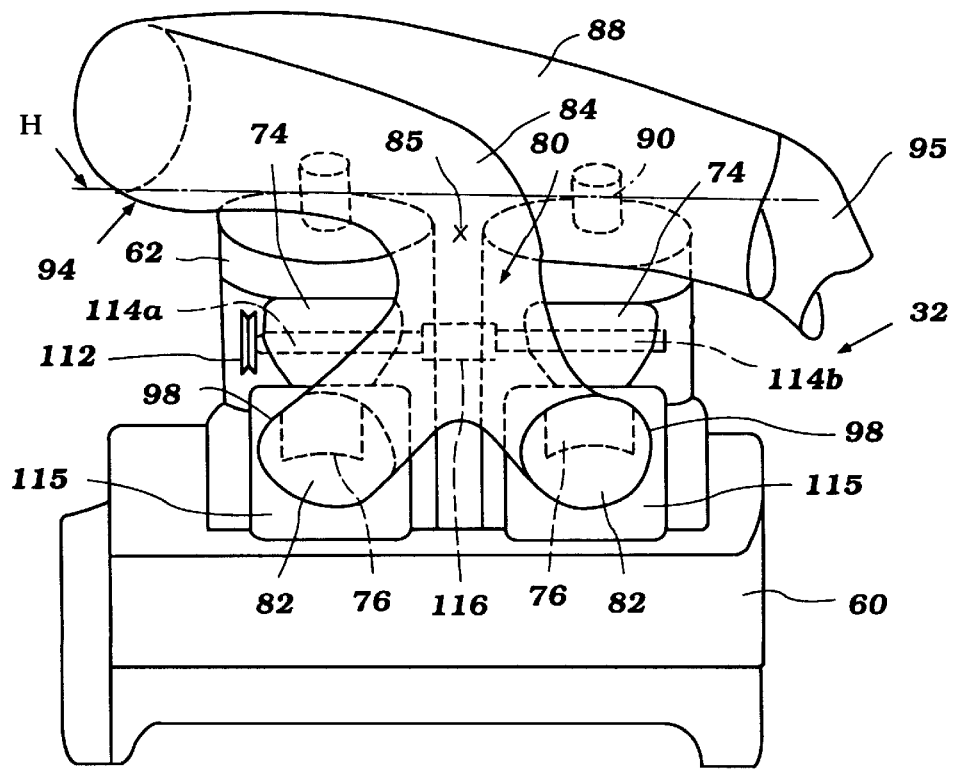
FIG. 4B is a side elevational view of the engine and exhaust arrangement of FIG. 4A.

As shown in FIG. 4A, in a first illustrated embodiment, a two cylinder engine 32 is connected to the exhaust system 72. The two exhaust ports 76 of the cylinders are in communication with a symmetrical Y-shaped exhaust pipe 80. The exhaust pipe 80 consists of two short exhaust branch pipes 82 which merge together in a merge pipe 84. The exhaust pipe branch pipes extend outward from the cylinder block 60 in a generally lateral direction (i.e., in a direction generally parallel to the lateral axis). The exhaust branch pipes 82 then extend generally upward toward a merge point 85. The merge point 85 desirably lies about and to the side of the exhaust ports of the engine cylinders. Upon merging in a merge pipe 84, the pipe 80 then continues in a generally longitudinal direction (i.e., in a direction generally parallel to the longitudinal axis). In particular, the pipe 80 extends generally forward toward a front surface of the engine as depicted in FIG. 4A. Desirably, the pipe 80 begins its longitudinal travel after being elevated such that a substantial portion, including the flow axis, of the pipe 80 is located above a horizontal plane defined by the uppermost portion of the cylinders. In the illustrated embodiment, shown in FIG. 4B, the flow axis of the pipe 80 is located above the uppermost portion of the cylinder head 62. As illustrated in FIG. 4A, upon reaching the front surface of the cylinder block 60, the pipe 80 bends toward a longitudinal vertical plane which contains the rotational axis of the engine output shaft 38. The pipe 80, thus, substantially wraps around the front of the cylinder block 60 and crosses over the vertical plane V.

FIG. 4A shows the pipe 80 joining an exhaust chamber 88 which is located on the opposite side of the longitudinal vertical plane from the cylinders and the merge pipe 84. The exhaust chamber 88 in the illustrated embodiment is desirably an expansion chamber. As will be recognized by one skilled in the art, however, the exhaust chamber 88 can also be a catalytic converter chamber or other chamber in which the exhaust can be deposited, accumulated or treated. As will be discussed below, the exhaust chamber 88 desirably has a dual shell construction formed by an inner shell which defines an exhaust chamber volume. The inner tube of the merge pipe 84 communicates with the exhaust chamber volume. The exhaust chamber has an enlarged passage or chamber through which exhaust routed from the passage in the exhaust pipe 80 flows.

A catalyst (not shown) can be positioned within the expansion pipe or proximate the exhaust chamber 88. The catalyst can preferably comprises a flow-through type honeycomb catalyst bed portion mounted within a housing and connected to the expansion pipe via a flange. The housing (not shown) is a generally cylindrical member having its first and second ends aligned with the flow path through the passage. The bed portion of the catalyst is arranged in the housing so that the exhaust flows therethrough.

After flowing through the exhaust chamber 88, the exhaust flows into a reducer pipe section 95 of the exhaust system 72. This portion of the exhaust system 72 tapers to a smaller diameter from that of the exhaust chamber 88. As will be discussed in detail below, the reducer pipe of the illustrated embodiment has a dual shell construction which creates separate flow paths for exhaust gases and cooling water. The wall dividing the two flows ends within a portion of the reducer pipe to allow the water to mix with the exhaust gases.

With reference to FIGS. 1 and 2, a flexible pipe section 97 is connected to the discharge end of the reducer pipe 95 and extends rearward along one side of the watercraft hull tunnel 48. The flexible conduit 97 connects to an inlet section of a water lock 96 device. The water lock 96 device also lies within the watercraft hull 12 on the same side of the tunnel 48 as the flexible conduit 97. The water lock 96 device has a sufficient volume to retain water and to inhibit the back flow of water to the exhaust chamber 88 and the engine 32. Internal baffles within the water lock 96 device help control water flow through the exhaust system 72.

An outlet exhaust pipe 166 extends from an outlet section of the water lock 96 device and wraps over the top of the tunnel 48 to a discharge end. The discharge end desirably opens either through the transom or into the tunnel 48 at an area that is close to or actually below the water level with the watercraft 10 floating at rest on the body of water. In this manner, exhaust flows from the engine 32 through the exhaust system 72 to its discharge within the water.

The illustrated embodiment thus extends the length of the branch pipes associated with each cylinder. The extended branch pipes enhance the performance of the engine. In addition, the arrangement of the exhaust system of the illustrated embodiment serves to protect sensitive components such as the exhaust control valves and actuator transmission. The arrangement also partially shields the spark plugs and associated wires from sloshing water which may accumulate within the engine compartment. Further, the illustrated exhaust system effectively counterbalances the branch and merge pipes with the exhaust chamber to result in a more even distribution of weight on either side of the engine.

Figure 5A:
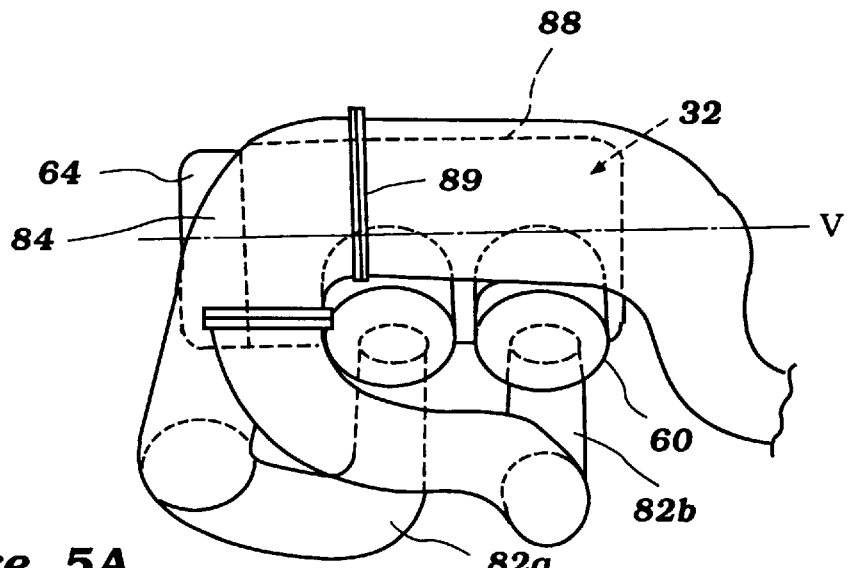
FIG. 5A is a top plan view of an additional embodiment of an engine and exhaust system arrangement having features in accordance with the present invention.
Figure 5B:
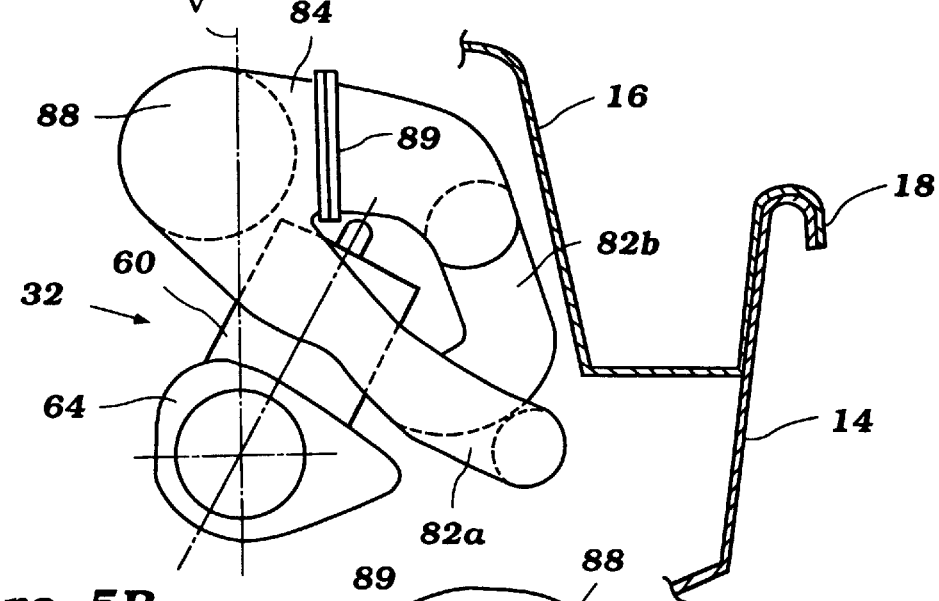
FIG. 5B is a side elevational view of the engine and exhaust system arrangement of FIG. 5A.
Figure 5C:
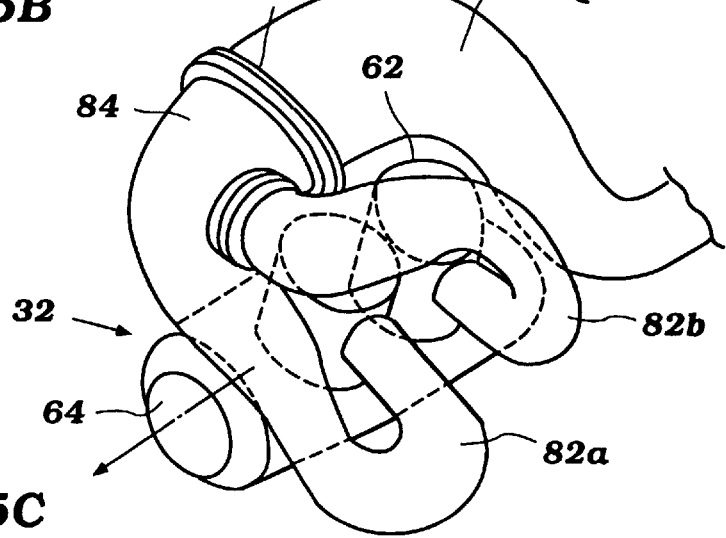
FIG. 5C is a top rear perspective view of the engine and exhaust system arrangement of FIG. 5C.

FIGS. 5A through 5C illustrate another embodiment of the exhaust system 72. An inclined two-cylinder engine 32 is illustrated; however, as will be appreciated by one skilled in the art, any engine configuration can be utilized with the illustrated exhaust system 72. FIG. 5 illustrates two exhaust branch pipes 82 extending in a lateral direction outward from the cylinder block 60. The forward exhaust branch pipe 82a then extends forward toward a front surface of the cylinder block 60. The rear exhaust branch pipe 82b extends upward and then forward toward the front surface of the cylinder block 60. A horizontal plane may be defined at the uppermost portion of the cylinder. The rear exhaust branch of the illustrated embodiment is at least partially located above the horizontal plane.

A vertical plane extends longitudinally and includes the axis of rotation of the engine output shaft in the illustrated embodiment. In the illustrated embodiment, both exhaust branch pipes 82a, 82b extend around the front surface of the cylinder block 60 prior to merging in a merge pipe portion 84 of the exhaust system 72. The branch pipes 82a, 82b, are connected to the merge pipe portion 84 through a flanged connection 89. As shown, the branch pipes actually merge on a side of the vertical longitudinal plane which is opposite the cylinder heads. In particular, a merge point 85 is located on the opposite side of the vertical plane from the inclined cylinders and associated exhaust ports. As illustrated in FIG. 5B, the merge pipe portion 84 of the exhaust system 72 is also desirably arranged substantially above the horizontal plane. The illustrated embodiment is preferably configured such that the merge pipe portion 84 is located substantially above a second horizontal plane which includes the uppermost portion of the cylinder heads 62.

The illustrated embodiment further extends the length of the branch pipes associated with each cylinder as compared to the first embodiment. The extended branch pipes serve to further enhance the performance of the engine. In addition, the arrangement of the exhaust system of the illustrated embodiment also serves to protect sensitive components such as the exhaust control valves and actuator transmission. The arrangement of the second branch pipe partially shields the spark plugs and associated wires from sloshing water which may accumulate within the engine compartment. Further, the illustrated exhaust system effectively counterbalances the branch pipes with the exhaust chamber to result in a more even distribution of weight on either side of the engine. The weight of the merge pipe is effectively transferred substantially forward of the cylinder block.

The exhaust pipe 84 is joined to an exhaust chamber 88 using a flange or flexible coupling 83 in a manner known to those skilled in the art. The exhaust chamber 88 in the illustrated embodiment is an expansion chamber; however, the exhaust chamber 88 can also be a catalytic converter chamber or other chamber of enlarged cross-sectional flow area. As illustrated in FIG. 5C, the exhaust chamber 88 is in communication with the balance of the exhaust system 72 as described above. In addition, the exhaust system 72 is also provided with a cooling water jacket system substantially as described below.

The exhaust system also desirably includes an exhaust control device 98. The device 98 controls the flow of exhaust gases through the exhaust passages 74 from the combustion chambers depending on the speed of the engine. The exhaust control device 98 comprises a sliding-knife type or gate-type valve and an actuator mechanism or transmission for moving the valve.

Figure 6:
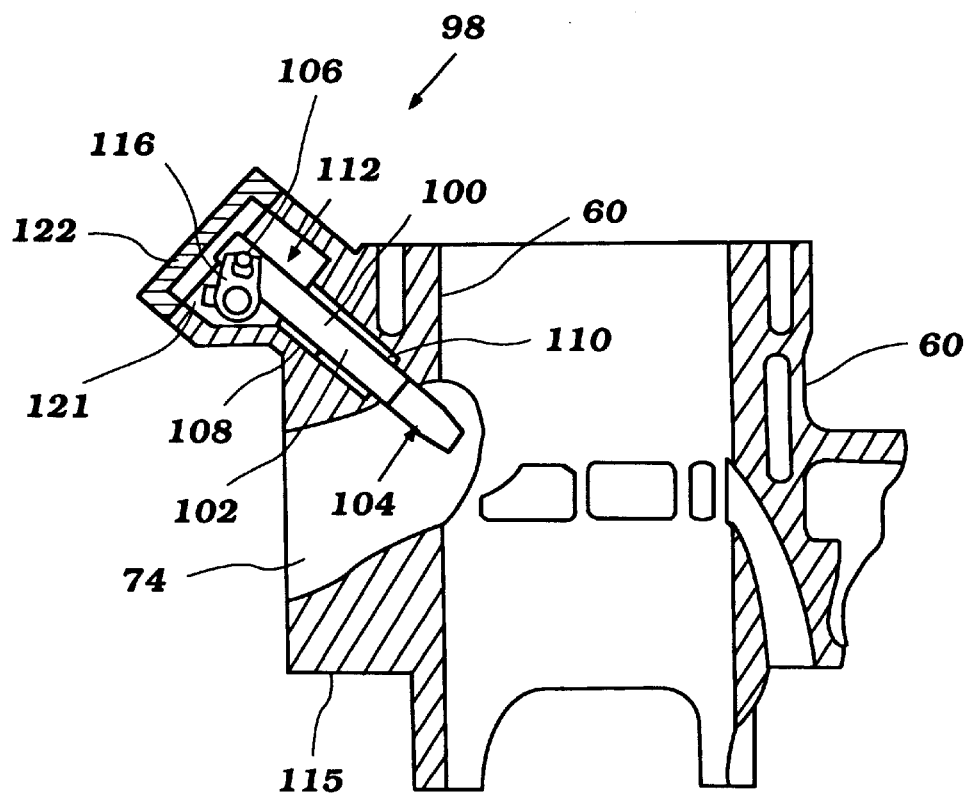
FIG. 6 is a partial cross-sectional view of the cylinder, an exhaust control valve and as associated actuator transmission having features in accordance with the present invention.

As illustrated in FIG. 6, the valve has a body 100 with an elongate stem 102 with a plate 104 connected at one end and a pin 106 at the other. The plate 104 is flat, and includes a generally circular cut-out edge opposite the stem 102. The edge is shaped such that when the body 100 of the valve is retracted, the edge cooperates with the cylinder block 60 to define a smooth exhaust passage 74.

As illustrated in FIG. 6, the valve is generally mounted within a boss 115 on the cylinder block 60. In particular, a guide 108 or passage extends through the boss 115 on the cylinder block 60 from a top side adjacent the cylinder head 62 into the exhaust passage 74. The passage includes a narrow portion adjacent the passage in which the plate 104 of the body 100 of the valve is positioned. The passage includes an adjacent enlarged section extending inwardly from the top of the cylinder block 60 in which a sleeve bearing 110 is positioned. The sleeve bearing 110 is maintained in position by one or more bolts or similar fasteners. The bearing is sized to slidably accept the stem 102 portion of the body 100 of the valve.

So arranged, the body 100 of the valve is moveable between a first position and a second position. In a first position, the body 100 of the valve is moved downwardly so that the plate 104 extends into the exhaust passage 74, partially blocking it. This has the effect of delaying the time the exhaust starts to pass from the combustion chamber to the exhaust passage 74 (as the piston moves downwardly from top dead center) and has the effect of causing the exhaust to stop flowing earlier (as the piston moves upwardly) as compared to the second position of the valve. In the second position, the body 100 (namely the plate 104) of the valve does not obscure, or at least obscures less as compared to its first position, of the passage. In this position, the exhaust flow starts earlier and lasts longer.

As stated above, an actuator system moves the valve body 100 between its first and second positions. Preferably, this actuator system comprises an actuating device in the form of a motor (not shown). In the preferred embodiment of the invention, the motor is mounted remote from the valve body 100, and as such, the actuator system includes a transmission mechanism 112 for transmitting movement of the actuator to the valve body 100.

The motor can be mounted to an upwardly extending wall section of the hull 12. Preferably at least this section of the hull 12 comprises a reinforced fiber resin material, so as to serve as a vibration insulator. So as to be readily accessible, the motor is mounted adjacent the access opening below the front seat 20. In addition, the motor is positioned near the top of the wall so that in the event water enters the engine compartment, the motor is positioned above the water level.

Figure 7:
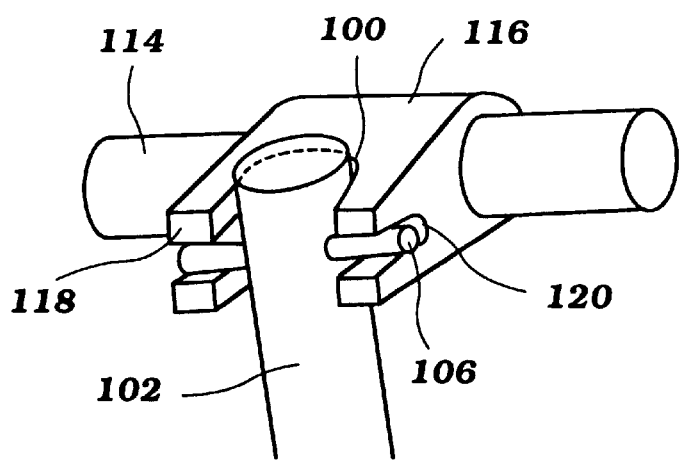
FIG. 7 is a perspective view of the exhaust control valve actuator transmission of FIG. 6.
Figure 8:
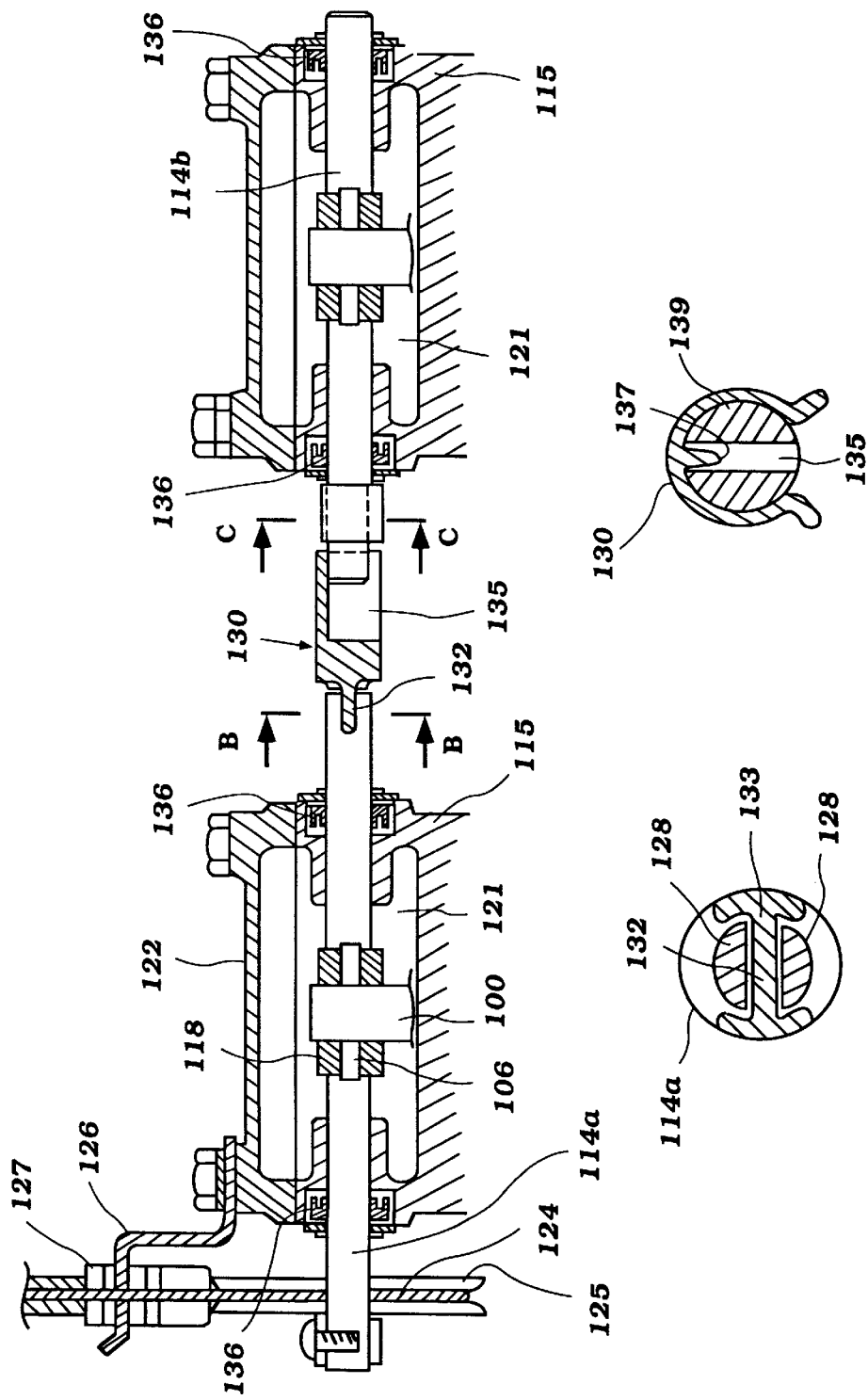
FIG. 8A is a cross-sectional side elevational view of the exhaust control valve actuator transmission of FIG. 6.
FIG. 8B is a cross-section of FIG. 8A taken along line B–B.
FIG. 8C is a cross-section of FIG. 8A taken along line C–C.

As illustrated in FIGS. 6 through 8, the transmission mechanism 112 includes a pair of shafts 114a, 114b mounted for rotation with respect to the respective boss 115 of the cylinder block 60. A shaft 114a extends inwardly from a rear end of the cylinder block 60 in the longitudinal direction, and a shaft 114b extends inwardly from a front end of the cylinder block 60 in the longitudinal direction. The shafts are desirably colinear and rotate about a common axis. Each shaft 114a, 114b has a connecting part 116 extending from its end opposite the end of the cylinder block 60. The connecting part 116 extends parallel to the shafts 114a, 114b.

The shafts 114a, 114b desirably are journaled by suitable bearings for rotation within the boss 115 located on each cylinder. As indicated in FIG. 8A, both shafts are provided with sealing members 136 located external to the bosses 115 at either end of the connection part 116 and the corresponding exhaust control device 98.

As depicted in FIG. 7, an arm 118 extends from the connecting part 116 generally perpendicular thereto. The arm 118 has a slot 120 for accepting the pin 106 extending from the top end of the stem 102. Preferably, each shaft 114a, 114b is mounted under a cover 122 connected to the top of the boss 115 of the cylinder block 60, as shown in FIG. 6. In particular, the connecting part 116 and a portion of the shafts 114a, 114b are contained within an operating chamber defined by the internal surface of the boss 115 and the cover 122. The cover 122 is mounted to the boss 115 of each cylinder using bolts or other suitable means.

In addition, and as best illustrated in FIG. 8A, the transmission mechanism 112 includes a looping cable 124 extending around a motor pulley (not shown) mounted on an output shaft of the motor (not shown) and a follower pulley 125 mounted on the end of the shaft 114a corresponding to the valve closest the rear end of the engine. The illustrated cable 124 in FIG. 8 is desirably a wire having an external sheath, such as, for example, a bowden-wire cable. In the illustrated embodiment, a bracket 126 secures a bushing device 127 near the follower pulley 125. The bushing device 127 allows the central wire of the cable to extend through the bushing and fixes the location of the wire relative to the follower pulley 125.

The transmission mechanism 112 is arranged so that if the motor rotates the pulley in a first direction, the cable 124 moves in the same direction, rotating the follower pulley 125. Rotation of the follower pulley 125 causes the shafts 114a, 114b to rotate, and the arm 118 to move the pin 106 of the valve body stem 102, and thus the connected valve plate 104.

The two shafts 114a, 114b, desirably are connected together in a manner causing the shafts to rotate together while permitting thermal expansion of the shafts without creating interference, pinching or binding in the assembly. In the illustrated embodiment, a connection having a unique cross section is utilized. As illustrated in FIG. 8B, a pair of fingers 128 located on the first shaft 114a are configured to lie to either side of a central flange 132 at the first end of a connector 130. The second shaft 114b, as illustrated in FIG. 8C, also in configured with a pair of fingers 139. The connector 130 is removably snap fit over the fingers 139 such that a rib 137 can nonrotatably secure the connector 130 to the second shaft 114b with a slot 135. This unique connector configuration serves to allow, among other things, the two shafts 114a, 114b to expand and contract in length without causing misalignments within the exhaust control valve activator.

Desirably, the exhaust system 72, as described above, nestles the exhaust control valve 98 within the region defined by the cylinder block 60 and the exhaust system 72. In particular, the exhaust system, as described above, has a portion which is substantially upturned. The substantially upturned portion has a flow axis. The boss, the exhaust control valve mounted within the boss and the associated actuator transmission are all positioned within a region defined by a plane which includes the cylinder wall and by a plane which includes the flow axis of the upturn portion of the exhaust pipe.

A motor control, such as an engine control unit (ECU) is provided for controlling the motor in an appropriate manner so as to control the movement of the valves in relation to the engine speed and load and other characteristics of the engine.

Notably, the transmission mechanism 112 is arranged so that watercraft vibration and hull distortion does not affect the valve actuation. In particular, the slight resiliency of the cable and its flexibility serves to prevent vibrations from being transmitted to the motor from the engine, or from the watercraft to the engine.

As illustrated, the motor is preferably mounted on that side of the hull 12 towards which the engine 32 is inclined. In this manner, the transmission mechanism 112 spans a short distance, so that only a short cable 124 is necessary. This improves the response between the actuator (motor) and the valve body 100.

In addition, in order to reduce the transmission of vibrations from the watercraft to the motor, the entire hull, or preferably at least that portion of the hull to which the motor is mounted, comprises a fiber reinforced resin material. It is also contemplated that other vibration isolating apparatus and designs may be utilized, such as a rubber pad positioned between the motor and the hull.

Figure 9:
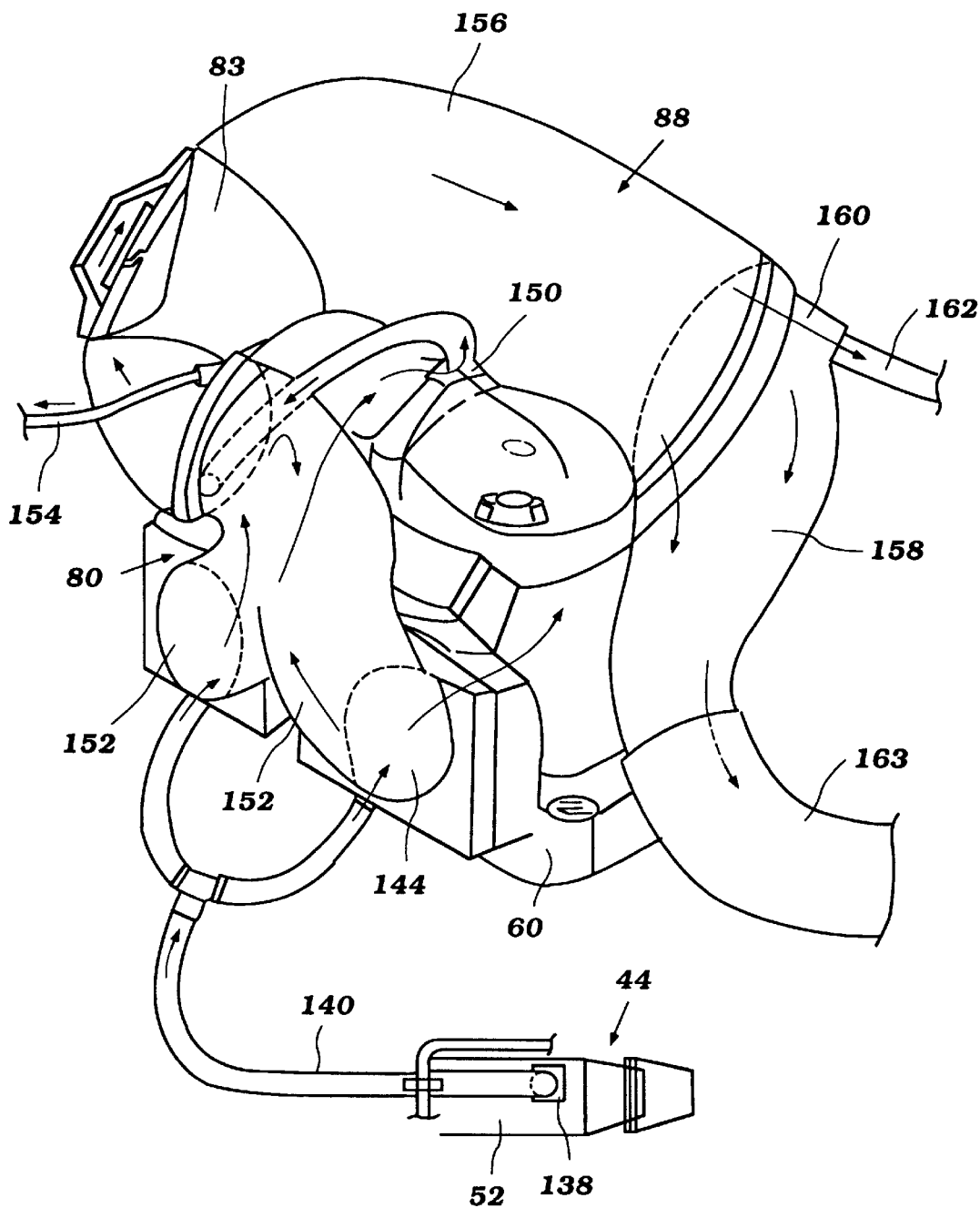
FIG. 9 is a schematic view of an engine and exhaust system having an open-loop cooling system configured in accordance with an embodiment of the present invention, and schematically illustrates a portion of a propulsion unit of the personal watercraft.

In order to cool the engine and the exhaust during operation, the propulsion unit 44 supplies cooling water through a conduit 140 to an engine water jacket 144. For this purpose, as best seen in FIG. 9, an outlet port 138 is formed on the housing of the pressurization chamber 52 of the jet propulsion unit 44. The conduit 140 is coupled to the outlet port 138 and extends to a pair of inlet ports of the engine water jacket 144 and to the manifold water jacket through the bosses 115 located on the wall of each cylinder near the exhaust ports. In the illustrated embodiment, the inlet ports are arranged at the lower end of the engine block proximate the bosses 115 of the cylinder block.

The engine water jacket 144 extends through cylinder block 60, about the cylinders, and through the cylinder head assembly 62. The cylinder head 62 includes a water discharge port 150 through which the cooling water exits the engine. In addition, a portion of the cooling water flows into the exhaust manifold water jacket 152.

As illustrated in FIG. 9, a water jacket 152 surrounds the manifold or exhaust pipe 80. In particular, an outer tube surrounds the inner exhaust passage which is defined by an inner tube. The inner and outer tubes may be cast together in a unitary piece or may be separately formed and assembled together. The resulting dual shell construction of the water jacket provides a plurality of passages which are formed in the walls of the exhaust manifold adjacent to the branch pipe and the merge pipe. A water inlet opening desirably is formed on the lower end of the exhaust manifold. In particular, the inlet is the lowermost portion of the water passages that surround the branch pipes. The inlet is in communication with engine water jacket discharge ports 150. In addition, as shown in FIG. 9 and mentioned above, the manifold water jacket inlet receives water from the conduit extending from the jet pump compression chamber.

The water passages about the branch pipes extend up through the merge pipe to an outlet opening. The outlet opening communicates with water passages in the engine block. The water circulates through the engine and is discharged through an outlet conduit. The outlet conduit communicates with a flexible joint 87 and the telltale conduit 154.

A small amount of cooling water passes through one of the discharge ports and into a telltale line 154. As telltale water, the water desirably is discharged from a plate (not shown) on a side of the watercraft 10 in a position visible to the rider.

The flexible joint 87 allows for thermal expansion of the exhaust pipe 80 and the exhaust chamber 88. The flexible joint extends between the water jacket which surrounds the end of the exhaust pipe 80 and the water jacket which surrounds the exhaust chamber 88.

The exhaust chamber 88 in the illustrated embodiment, as discussed above, is desirably an expansion chamber. The exhaust chamber has a generally tubular shape in which an expansion volume can be defined within a center passage. A water jacket 156 is defined between an outer shell and an inner shell. The inner shell defines the center exhaust passage. The water jacket passage 156 thus extends about the expansion chamber wall and communicates with the waterjacket of the manifold 152.

The outlet end of the exhaust chamber 88 communicates with a reducer pipe 158 which tapers in diameter toward its outlet. The pipe has a dual shell construction formed by an inner shell which defines an exhaust flow passage. The expansion volume communicates with this passage. In the reducer pipe 158, the wall separating the water from the exhaust ends and the two are allowed to mix.

A portion of the cooling water is discharged through a terminal outlet port 160 because too much cooling water in the exhaust stream tends to cause flow resistance. A conduit 162 carries the cooling water that is discharged through the terminal outlet port 160 to the outlet end of the exhaust pipe.

The lower section of the reducer pipe 158 includes a downwardly turned portion that terminates at the discharge end. The inner shell stops short of the outer shell such that the water flow through the water jacket merges with the exhaust gas flow through the exhaust passage 74 at the discharge end as described above.

A flexible pipe 163 is connected to the discharge end of the reducer pipe 158 and extends rearward along one side of the watercraft hull tunnel 48 (FIGS. 1 and 2). The flexible conduit 163 connects to an inlet section of a water lock 96 device. The water lock 96 device also lies within the watercraft hull 12 on the same side of the tunnel 48.

The water lock 96 device has a sufficient volume to retain water and to preclude the back flow of water to the expansion chamber and the engine. Internal baffles within the water lock 96 device help control water flow through the exhaust system 72.

An exhaust pipe 164 extends from an outlet section of the water lock 96 device and wraps over the top of the tunnel 48 to a discharge end. The discharge end desirably opens into the tunnel 48 at an area that is close to or actually below the water level with the watercraft floating at rest on the body of water.

Several embodiments have been described and illustrated throughout the specification. As will be readily apparent to one of skill in the art, the features of each embodiment may be readily incorporated into any of the other disclosed embodiments. In addition, although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. An engine for a watercraft comprising an output shaft journalled to rotate about a rotational axis, at least one inclined cylinder having an axis skewed relative to a longitudinally-extending, vertical plane that contains the rotational axis, and an exhaust system including an exhaust pipe and an exhaust chamber, the exhaust pipe being coupled to the cylinder on a first side of the vertical plane and being coupled to the exhaust chamber on an opposite, second side of the vertical plane.

2. The engine as in claim 1, wherein the exhaust chamber is arranged to lie entirely on the second side of the vertical plane.

3. The engine of claim 1, wherein the exhaust pipe is connected to a cylinder wall of the cylinder which is generally located on a side of the cylinder axis opposite the vertical plane.

4. The engine of claim 3 additionally comprising a boss located between the cylinder wall and a portion of the exhaust pipe.

5. The engine of claim 4, wherein the exhaust pipe includes an upwardly extending portion that includes a flow axis, and the boss is located between a second plane, which contains the cylinder axis and extends generally parallel to the rotational axis, and a third plane which contains the flow axis of the upwardly extending portion of the exhaust pipe and extends generally parallel to the rotational axis.

6. The engine of claim 5 additionally comprising an exhaust control valve contained within the boss and operating between a port of the cylinder and the exhaust pipe.

7. The engine of claim 1 additionally comprising an engine intake system arranged below the exhaust chamber.

8. An engine for a watercraft comprising an output shaft that rotates about a rotational axis defined within a longitudinal vertical plane, a cylinder and an exhaust system having an exhaust pipe and an exhaust chamber with the exhaust pipe extending at least partially between the cylinder and the exhaust chamber, the exhaust pipe and the exhaust chamber each including a longitudinal section that extends generally parallel to the longitudinal vertical plane, the exhaust pipe and the exhaust chamber being arranged with at least portions of the longitudinal sections lying above a horizontal plane that is generally normal to the longitudinal vertical plane and is defined at an uppermost portion of the cylinder.

9. The engine of claim 8, wherein a section of the exhaust pipe extends across the longitudinal vertical plane.

10. The engine of claim 8, wherein the exhaust chamber is an expansion chamber.

11. The engine of claim 8, wherein the horizontal plane is further defined at the uppermost portion of a combustion chamber of the cylinder.

12. The engine of claim 11, wherein the horizontal plane is further defined at the top surface of a cylinder head of the engine that forms an upper end of said cylinder.

13. The engine of claim 8 additionally comprising an exhaust control valve operating between the cylinder and the exhaust pipe, the valve being positioned within an area defined between the cylinder and an upstanding section of the exhaust pipe.

14. The engine of claim 8, wherein the exhaust chamber lies principally on one side of the longitudinal vertical plane, and the cylinder principally lies on the other side of the longitudinal vertical plane.

15. The engine of claim 8 additionally comprising an engine intake system arranged below the exhaust chamber.

16. The engine of claim 8 additionally comprising at least one additional cylinder, the cylinders each having an exhaust port, and the exhaust pipe including a plurality of exhaust branches, each exhaust branch communicating with a respective exhaust port, the exhaust branches merging together at a merge point within the exhaust pipe which lies above the cylinder ports.

17. The engine of claim 16, wherein the merge point of the exhaust pipe is arranged substantially between two of the exhaust ports and on the same side of the cylinder axes as the exhaust ports.

18. The engine of claim 16, wherein the merge point of the exhaust pipe lies on one side of the longitudinal vertical plane and the exhaust ports lie on the same side of the longitudinal vertical plane.

19. The engine of claim 8, wherein the cylinder is arranged such that an axis of the cylinder is skewed relative to the longitudinal vertical plane.

20. The engine of claim 8 additionally comprising an ignition plug positioned in an uppermost portion of the engine and located between the exhaust pipe and the exhaust chamber.

21. An engine for a watercraft comprising an output shaft rotating about an axis, a plurality of cylinders located substantially to one side of a longitudinal vertical plane that contains said axis, an exhaust pipe extending from each cylinder, at least two of the exhaust pipes merging together at merge portion, the merge portion being arranged substantially on a side of the longitudinal vertical plane opposite the side on which the at least two exhaust pipes communicate with the respective cylinders.

22. The engine of claim 21, wherein the merge portion communicates with an exhaust chamber, and the exhaust chamber is principally arranged on the same side of the vertical plane as the merge portion.

23. The engine of claim 22, wherein one exhaust pipe and the exhaust chamber each include a longitudinal section that extends generally parallel to the longitudinal vertical plane, and the exhaust pipe and the exhaust chamber are arranged with at least portions of the longitudinal sections lying above a horizontal plane that is generally normal to the longitudinal vertical plane and is defined at an uppermost portion of the cylinder.

24. The engine of claim 21, wherein the plurality of cylinders are inclined such that an axis of each cylinder is skewed relative to the longitudinal vertical plane.

25. The engine of claim 21, wherein an exhaust control valve mechanism is arranged in a space defined between the cylinders and the exhaust pipes and operates between respective cylinders and exhaust pipes.

26. An engine for a watercraft comprising a cylinder, the cylinder having an exhaust port, an exhaust branch pipe having a first portion and a second portion, the first portion of the exhaust branch pipe being coupled to the exhaust port, and the second portion of the exhaust branch pipe extending in a generally upward direction, an exhaust control valve operating between the cylinder and the first portion of the exhaust branch pipe, and a valve actuator transmission coupled to the exhaust control valve and located in an area defined between the cylinder, the first portion of the exhaust branch pipe and the second portion of the exhaust branch pipe.

27. The engine of claim 26, wherein the cylinder is arranged with its axis skewed relative to a longitudinally-extending, vertical plane.

28. The engine of claim 26 wherein the exhaust control valve is moveable to vary the effective flow area through an exhaust port.

29. A watercraft comprising a hull having a longitudinal axis, an engine positioned in the hull and including an output shaft, the output shaft being journalled to rotate about a rotational axis that is generally parallel to the longitudinal axis, an inclined cylinder being arranged within the hull such that an axis of the cylinder is skewed relative to a longitudinally-extending, vertical plane that contains the rotational axis, and an exhaust system including an exhaust pipe and an exhaust chamber, the exhaust pipe being coupled to the cylinder on a first side of the vertical plane and being coupled to the exhaust chamber on an opposite, second side of the vertical plane.

30. The engine of claim 29, wherein the exhaust pipe and the exhaust chamber each includes a longitudinal section that extends generally parallel to the longitudinally-extending, vertical plane.

31. The engine of claim 30, wherein the exhaust pipe and the exhaust chamber are arranged with at least portions of the longitudinal sections lying above a horizontal plane that is generally normal to the longitudinally-extending, vertical plane as defined at an uppermost portion of the cylinder.

32. The engine of claim 29 additionally comprising at least one additional cylinder, the cylinders each having an exhaust port, and the exhaust pipe including a plurality of exhaust branches, each exhaust branch communicating with a respective exhaust port, the exhaust branches merging together at a merge point within the exhaust pipe which lies above the cylinder ports.

33. The engine of claim 32, wherein the merge point of the exhaust pipe is arranged substantially between two of the exhaust ports on the same side of the cylinder axes as the exhaust port.

34. The engine of claim 29 additionally comprising an exhaust control valve operating between the cylinder and the exhaust pipe, the valve being positioned within an area defined between the cylinder and an upstanding portion of the exhaust pipe.

* * * * *